May 11, 1943.　　　　E. J. MASON　　　　2,319,147
AUXILIARY HANDLE
Filed Aug. 27, 1941
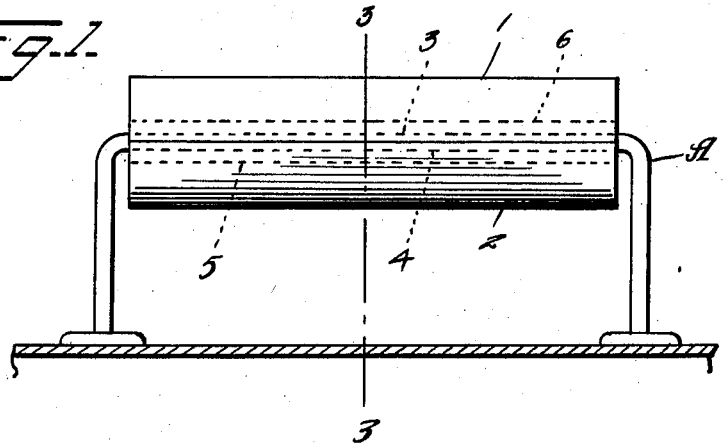
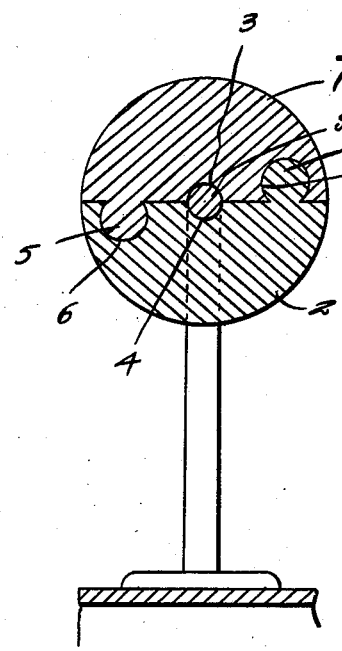
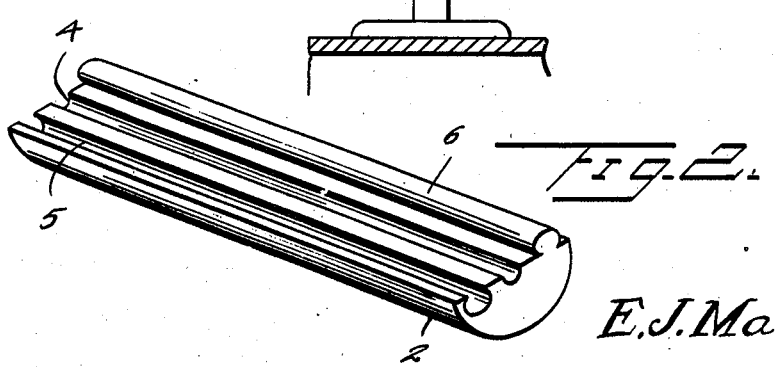
Inventor
E. J. Mason
By John Patten Duffie
Attorney Patented May 11, 1943

2,319,147

UNITED STATES PATENT OFFICE 2,319,147

AUXILIARY HANDLE

Ernest J. Mason, Marion, Ind.

Application August 27, 1941, Serial No. 408,535

2 Claims. (Cl. 16—114)

This invention relates generally to handles, and more especially to what may be termed an auxiliary handle for tea-kettles, coffee pots, buckets and other containers.

The primary object of my invention is to provide an auxiliary wooden handle that may be used to re-place burned or broken handles on tea-kettles, coffee pots, buckets or similar containers.

A further object of my invention is to provide an auxiliary handle of the character specified that is simple and economical in construction, and may therefore be sold in stores at a very small price.

Still another object of my invention is to provide an auxiliary handle for tea-kettles, coffee pots, or the like, that may be easily and readily applied to the bail of the handle, and is highly efficient and durable in use.

With the foregoing and other objects in view that will appear as the nature of my invention is better understood, the same consists in the novel features of construction, combination and arrangement of parts illustrated in the accompanying drawing and more particularly pointed out in the appended claims.

In the accompanying drawing, which is for illustrative purposes only and is therefore not drawn to scale:

Figure 1 is a side elevation, illustrating the application of my invention to a tea-kettle.

Figure 2 is a central longitudinal section, taken through the bail of the tea-kettle and my auxiliary handle, and Figure 3 is a vertical transverse section, taken on line 3—3 of Figure 2.

Referring to the drawing for a more particular description of my invention, and in which drawing like parts are designated by like reference characters throughout the several views, A designates the bail of the tea-kettle or other container, and B my auxiliary handle, as a whole.

As shown, my improved auxiliary handle is made in two half sections 1 and 2, respectively, of wood or other suitable material, and in carrying out my invention, the half sections are formed in their flat inner faces with the central longitudinal grooves 3 and 4, of semi-circular form in cross section, which are adapted to register and form a circular opening to receive the bail A of the tea-kettle or other container, when the parts are placed together.

Each half section is also formed in its inner face, adjacent one edge and in parallel relation with its central longitudinal groove, with a larger longitudinal groove 5, also preferably of semi-circular form in cross section, and on its inner face, adjacent its opposite edge, with a corresponding longitudinal tongue or rib 6. It will thus be seen that when the two parts or half sections are fitted together, the tongue or rib 6 of one section engages the corresponding groove 5 of the other section, thereby forming an interlocking joint or connection.

In practice, to replace a burned out or broken handle, one half section is placed under the bail with the latter resting in its central groove and the other half section then fitted into one end of the first mentioned section and pushed forward endwise until the two sections are entirely together and in operative position. The tongues and grooves will then hold the two half sections together and clamp them firmly to the bail, although a small quantity of glue or other adhesive material may be used to insure permanence, if desired.

It is to be understood that the handle is to be made in different sizes to meet the requirements, although embodying the same principle in all instances.

From the foregoing description taken in connection with the drawing, it is thought that the construction, operation and advantages of my invention will be readily understood, without requiring a more extended explanation.

Having described my invention, what I claim as new and desire to secure by Letters Patent, is:

1. An auxiliary handle for a bail, including two substantially identical half handles, each having a longitudinal bore therethrough, the half-handles when associated together forming a complete bore for bail accommodation, each handle at one side of said bore axis and in the confronting face being provided with a locking tongue parallel to the bore and substantially coextensive with the handle, there being a complementary locking groove parallel thereto and the bore in that face and spaced equi-distant from the bore axis and at the opposite side thereof from said tongue, the tongue of one half-handle seating in the locking groove of the other half-handle.

2. An auxiliary handle for peripheral embracement of and longitudinal locking upon a bail including two substantially identical half handles, each half handle having a face provided with a longitudinal groove positioned midway in that face and extending the full length of the half handle, the grooves when the half handles are faced and locked together forming a bore for bail accommodation, each half handle at one side of said bore forming groove and spaced from said bore and the adjacent longitudinal edge of the face including longitudinally directed tongue means substantially coextensive with the half handle, said tongue means remote from said face having a greater transverse width than immediately adjacent the face to form a locking tongue thereon, said face having opposite the tongue and spaced from the bore forming groove a like distance therefrom as the tongue is spaced therefrom, a locking groove parallel to the bore groove and the locking tongue and having a wall arrangement in transverse section substantially complementary to the tongue cross section, the locking groove being but slightly larger than the tongue for longitudinal slip fit association of two half handles and frictional retention in handle formation about the bail, the locking tongue of one half handle being received by the locking groove of the other half handle and the locking tongue of the last mentioned half handle being received by the locking groove in the said last mentioned one half handle.

ERNEST J. MASON.